United States Patent Office 3,108,431
Patented Oct. 29, 1963

3,108,431
METHOD OF PRODUCING THRUST FOR PROPULSION BY COMBUSTING A REACTION PRODUCT OF LiBH₄ AND NH₃ WITH AN OXIDIZER
Don L. Armstrong and William P. Knight, Covina, Calif., assignors to Aerojet-General Corporation, Azusa, Calif., a corporation of Ohio
Filed Nov. 16, 1956, Ser. No. 623,278
4 Claims. (Cl. 60—35.4)

This invention relates to liquid fuels and in particular to liquid fuels suitable for use in jet propulsion motors.

The object of this invention is to provide a liquid propellant comprising a stable solution of a normally high vapor pressure material capable of producing large quantities of combustible gases.

Although liquid ammonia is itself a high energy rocket fuel, this material as a high vapor pressure which renders it difficult to store in light weight containers and limits its wide application.

We have found that it is possible to effectively reduce the vapor pressure of liquid ammonia to less than one atmosphere at room temperature by the addition of lithium borohydride to the liquid ammonia. At the same time, the density of the solution is increased thereby extending the utility of the fuel and improving its performance.

Figure 1:
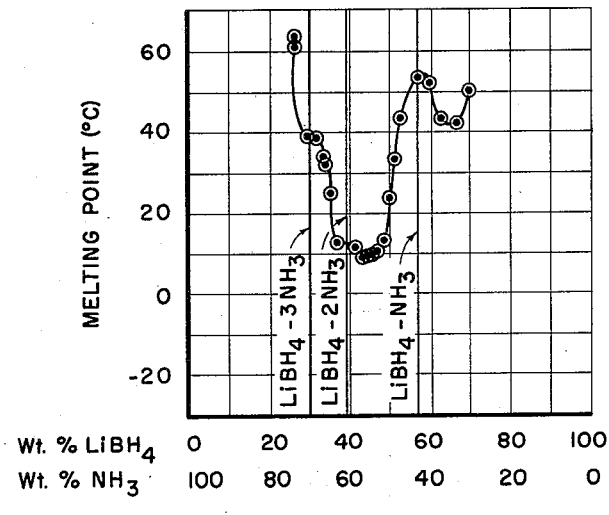

The new compositions of our invention are prepared simply by mixing the liquid ammonia and lithium borohydride in the proper proportions, as indicated in the following discussion. The reaction is preferably conducted in a pressure vessel in order to prevent the loss of ammonia through evaporation. Completion of the reaction is indicated by a substantial pressure drop in the pressure vessel. The reaction can also be conducted with gaseous ammonia, preferably in a closed system. The reaction temperature does not affect the course of the reaction in any way, except that where it is desired to dissolve quantities of lithium borohydride in excess of about 45% by weight, the saturation point at room temperature, the temperature must be elevated to slightly above the freezing point of the reaction product as indicated in FIG. 1 in order to effect complete dissolution. In the case of concentrations of lithium borohydride below the freezing point until the solubility point is reached. between the ammonia and the borohydrides which produces the ammoniates and which gradually lowers the melting point the solubility point is reached.

The following examples are presented to more clearly illustrate the invention and are not intended in any way to define or limit the scope of the invention.

EXAMPLE I

*Preparation of Lithium Borohydride Mono-Ammoniate*

44% by weight of liquid ammonia and 56% by weight of lithium borohydride are mixed together in a sealed pressure vessel. The temperature is raised to about 55° C. Upon completion of the reaction, as indicated by a pressure drop to approximately 30 mm., the resultant liquid solution is allowed to cool. The product has a melting point of about 52° C.

EXAMPLE II

*Preparation of Lithium Borohydride Di-Ammoniate*

61% by weight of liquid ammonia and 39% by weight of lithium borohydride are mixed together in a sealed pressure vessel at room temperature. Completion of the reaction is indicated by a pressure drop to approximately 100 mm. The product is a liquid having a freezing point of about 11° C.

EXAMPLE III

*Preparation of Lithium Borohydride Tri-Ammoniate*

70% by weight of liquid ammonia and 30% by weight of lithium borohydride are mixed together in a sealed pressure vessel at room temperature. Completion of the reaction is indicated by a pressure drop to about one atmosphere. The product is a solid having a melting point of about 39° C.

Starting with 100% liquid ammonia and varying the mixture until 100% lithium borohydride is obtained, as indicated, the composition of the solid phase is as follows:

| Approx. percent NH₃ | Composition | Approx. percent LiBH₄ |
|---|---|---|
| 100 | NH₃ | 0 |
| 70–100 | NH₃+LiBH₄·3NH₃ | 0–30 |
| 70 | LiBH₄·3NH₃ | 30 |
| 61–70 | LiBH₄·3NH₃+LiBH₄·2NH₃ | 30–39 |
| 61 | LiBH₄·2NH₃ | 39 |
| 44–61 | LiBH₄·2NH₃+LiBH₄·NH₃ | 39–56 |
| 44 | LiBH₄·NH₃ | 56 |
| 0–44 | LiBH₄·NH₃+LiBH₄ | 56–100 |
| 0 | LiBH₄ | 100 |

FIG. 1 is a graph showing the relationship of the various compositions to their melting points. It will be noted that peaks occur on the graph at the points corresponding to the pure mono-, di-, and tri-ammoniates. This is taken to be positive proof of the existence of the pure compounds at these points. This finding was verified by analysis of the mixture obtained at those points. Higher ammoniates such as the tetra-ammoniates and possibly the penta- (and even higher) ammoniates of lithium borohydride may be obtained with concentrations of lithium borohydride below about 30%. However, due to the steepness of the melting point curve in this region, these compositions cannot be detected with certainty.

Analysis of the pure ammoniates is rendered difficult by the fact that degradation of the ammoniates occurs fairly rapidly in the atmosphere, thus precluding any extensive study of crystal structure, or the like. The compounds are however quite stable below their melting points, and can be stored over long periods of time at these temperatures in a closed vessel.

Figure 2:
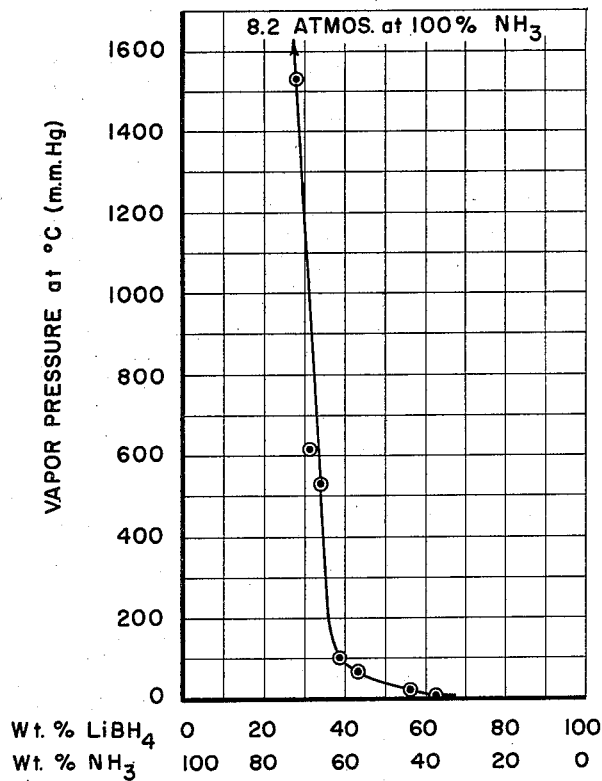

FIG. 2 illustrates the effect of increasing the concentration of lithium borohydride with respect to the vapor pressure of the reaction mass, it will be noted that the vapor pressure of 100% liquid ammonia is approximately 8.2 atmospheres, while the vapor pressure of a solution containing 55% lithium borohydride is only about 30 mm. of mercury. This remarkable reduction in the vapor pressure of liquid ammonia allows its use as a high energy rocket fuel without the use of specially constructed containers, controlled temperature conditions and so on. It will be appreciated that even with high concentrations of lithium borohydride, the specific impulse of the fuel is not reduced, but is in actuality increased.

All of the various mixtures encompassed on the graph, presented as FIG. 1, are useful for purposes of rocket propulsion.

Concentrations of lithium borohydride below about 30% have little utility as rocket fuels because of their high vapor pressure. The vapor pressure rises very steeply in the region below about 30% lithium borohydride. With concentrations above about 70% lithium borohydride, little advantage is gained since the vapor pressure is already reduced to approximately 20 mm. of mercury, a relatively insignificant amount.

The various ammoniates of lithium borohydride are either liquid or melt at ambient temperatures, as in indicated by the curve in FIG. 1. These substances have been isolated and were analyzed by evaporating the ammonia to determine the number of equivalents of ammonia relative to the number of equivalents of lithium borohydride, in order to identify the various ammoniates and mixtures thereof.

To use the novel compositions of this invention for purposes of rocket propulsion, it is preferred to prepare a saturated solution, about 45% lithium borohydride in liquid ammonia, thereby obtaining a minimal vapor pressure with a relatively small amount of lithium borohydride. Because of the significant reduction in vapor pressure, it is preferred to do this in advance of actual use because of the elimination of storage problems. The rocket fuel thus prepared can then be injected into a conventional rocket chamber at the same time as an oxidizer, for example, fuming nitric acid or liquid oxygen, and ignited by a conventional rocket igniter, thereby producing combustion. The large quantities of gases produced by the combustion are then allowed to escape through an orifice, producing thrust and propulsion. It will be appreciated that other oxidizers can be used, as for example, hydrogen peroxide, and the like.

Our invention provides a method for utilizing ammonia as a rocket fuel without the use of heavy, bulky and high pressure containers. The principal advantage of our invention resides in the fact that it permits a significant reduction in the vapor pressure of liquid ammonia, thereby making it readily usable and more practical for use in rocket motors.

An additional advantage is achieved due to the fact that the density of the fuel is increased appreciably, and with the increase in density, there is also achieved an increase in the specific impulse.

This application is a continuation-in-part of our co-pending U.S. patent application Serial No. 326,739, filed December 18, 1952, now abandoned.

We claim:

1. The method of producing thrust for propulsion, which comprises combusting the reaction product of from about 29% to about 70% by weight of lithium borohydride and from about 71% to about 30% by weight of ammonia with an oxidizer selected from the group consisting of fuming nitric acid, liquid oxygen and hydrogen peroxide in a combustion chamber, and allowing the resultant gases to escape, thereby producing thrust for propulsion.

2. Method of producing thrust for propulsion which comprises combusting the reaction product of about 56 percent by weight of lithium borohydride and about 44 percent by weight of ammonia with an oxidizer selected from the group consisting of fuming nitric acid, liquid oxygen and hydrogen peroxide in a combustion chamber and allowing the resultant gases to escape, thereby producing thrust for propulsion.

3. The method of producing thrust for propulsion which comprises combusting the reaction product of about 39 percent by weight of lithium borohydride and about 61 percent by weight of ammonia with an oxidizer selected from the group consisting of fuming nitric acid, liquid oxygen and hydrogen peroxide in a combustion chamber and allowing the resultant gases to escape, thereby producing thrust for propulsion.

4. The method of producing thrust for propulsion which comprises combusting the reaction product of about 30 percent by weight of lithium borohydride and about 70 percent by weight of ammonia, with an oxidizer selected from the group consisting of fuming nitric acid, liquid oxygen and hydrogen peroxide in a combustion chamber and allowing the resultant gases to escape, thereby producing thrust for propulsion.

References Cited in the file of this patent

UNITED STATES PATENTS

| | | |
|---|---|---|
| 2,643,184 | Cairns | June 23, 1953 |
| 2,648,190 | Maisner | Aug. 11, 1953 |
| 2,696,708 | Kittredge | Dec. 14, 1854 |
| 2,698,511 | Britton | Jan. 4, 1955 |
| 2,699,385 | Stevens et al. | Jan. 11, 1955 |
| 2,811,431 | Swicky et al. | Oct. 29, 1957 |

OTHER REFERENCES

Schechter et al.: "Boron Hydrides and Related Compounds," page 42, Jan. 8, 1951, declassified Jan. 5, 1954; prepared under contract NOa(s) 10992, Bureau of Aeronautics, Dept. of the Navy.

Ley: Coast Artillery Journal, pp. 25–29, January-February 1948.

Proell et al.: Journal of Space Flight, pp. 1–9, vol. 2, No. 1, January 1950.